Dec. 12, 1944.　　　A. J. BRIGGS　　　2,364,776
MACHINE FOR APPLYING HOOD CAPS TO BOTTLES
Filed April 7, 1941　　10 Sheets-Sheet 1

INVENTOR:
Arthur J. Briggs,
BY Boddell & Thompson
ATTORNEYS.

Dec. 12, 1944.  A. J. BRIGGS  2,364,776
MACHINE FOR APPLYING HOOD CAPS TO BOTTLES
Filed April 7, 1941  10 Sheets-Sheet 2
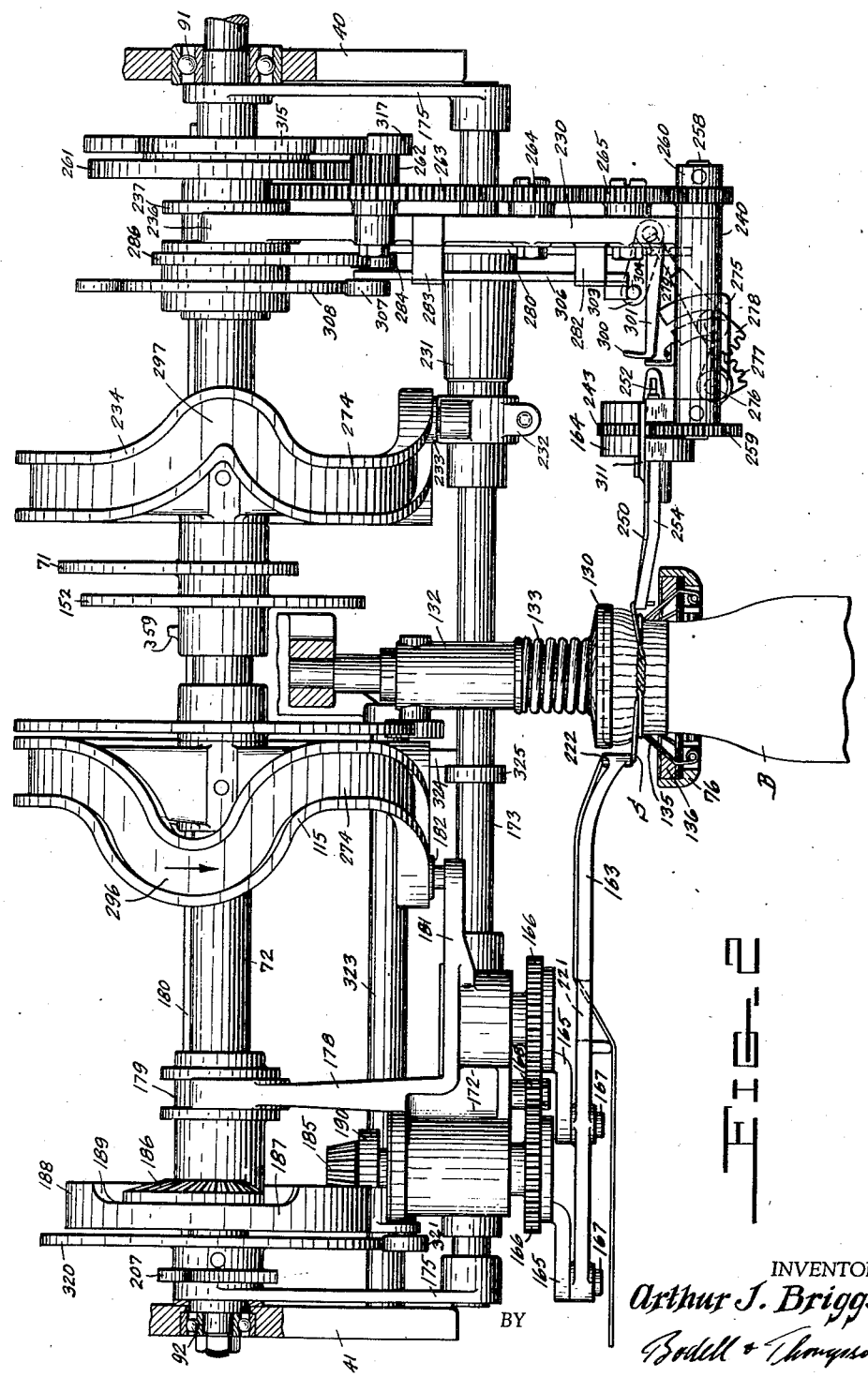
INVENTOR:
Arthur J. Briggs,
BY
Bodell & Thompson

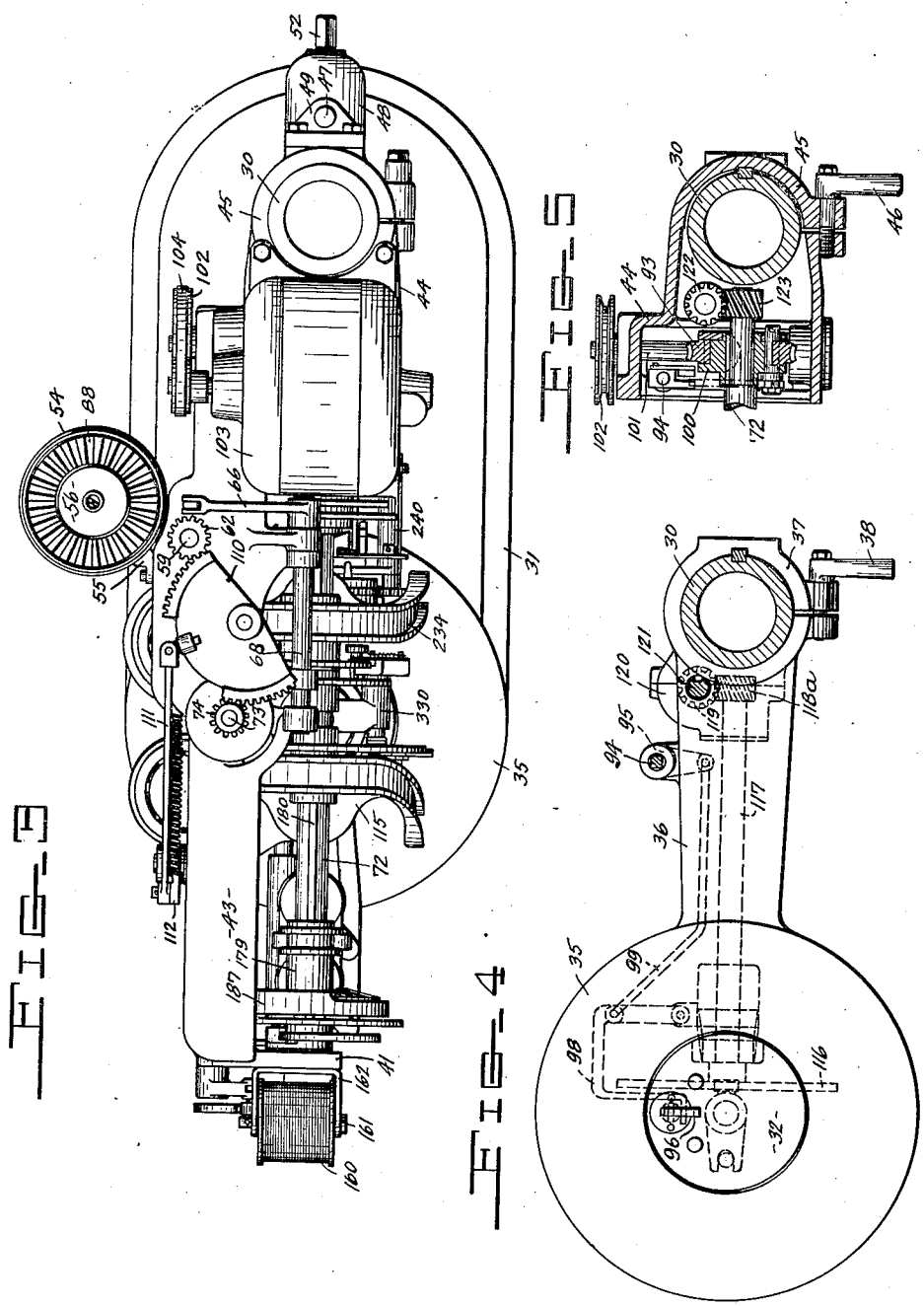

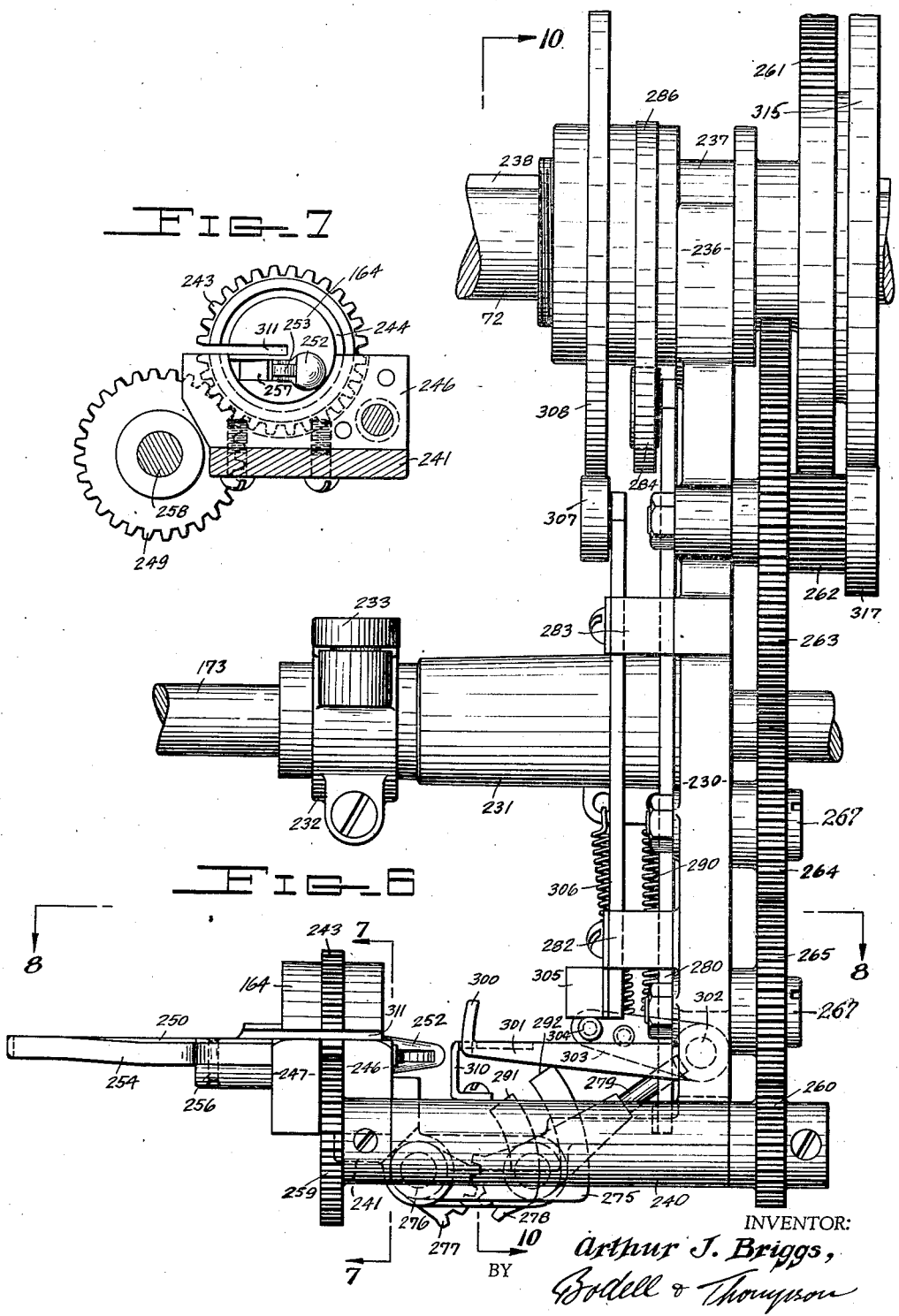

Dec. 12, 1944. A. J. BRIGGS 2,364,776
MACHINE FOR APPLYING HOOD CAPS TO BOTTLES
Filed April 7, 1941 10 Sheets-Sheet 5
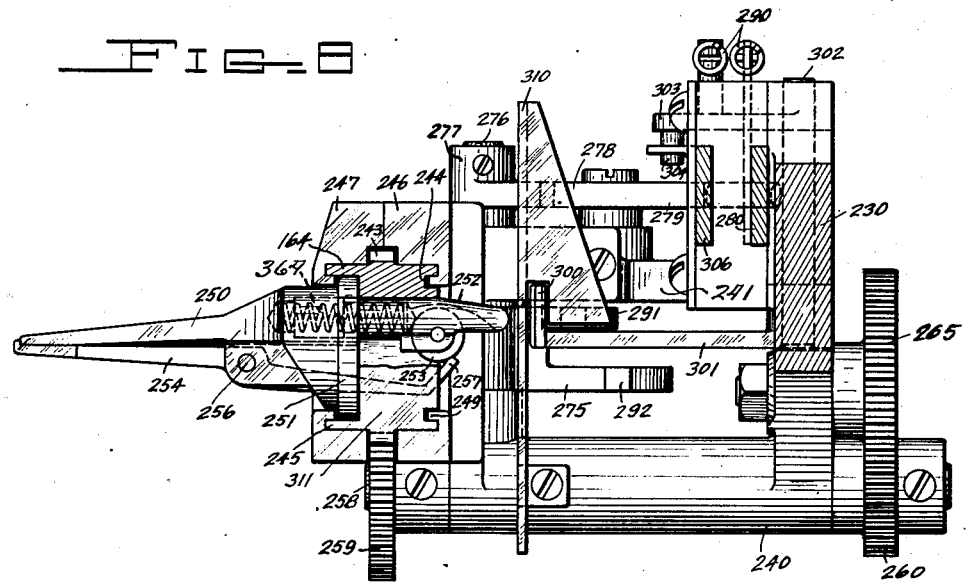
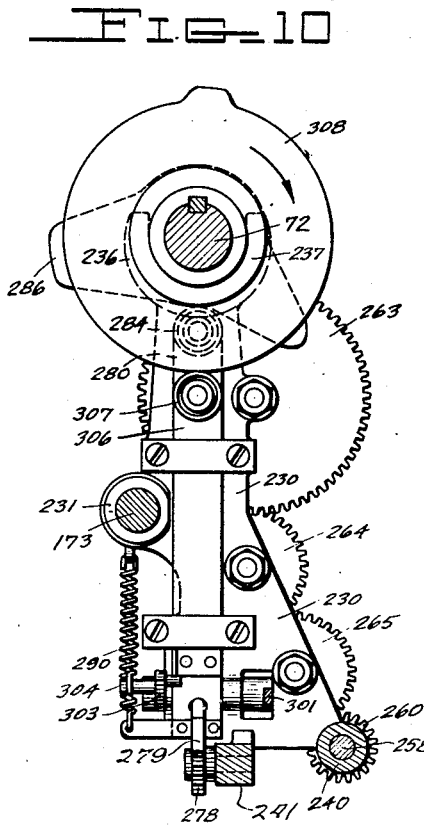
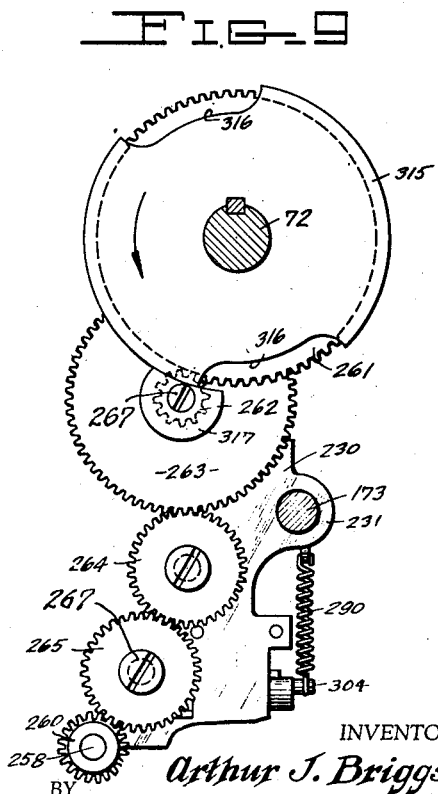
INVENTOR:
Arthur J. Briggs,
BY Bodell & Thompson

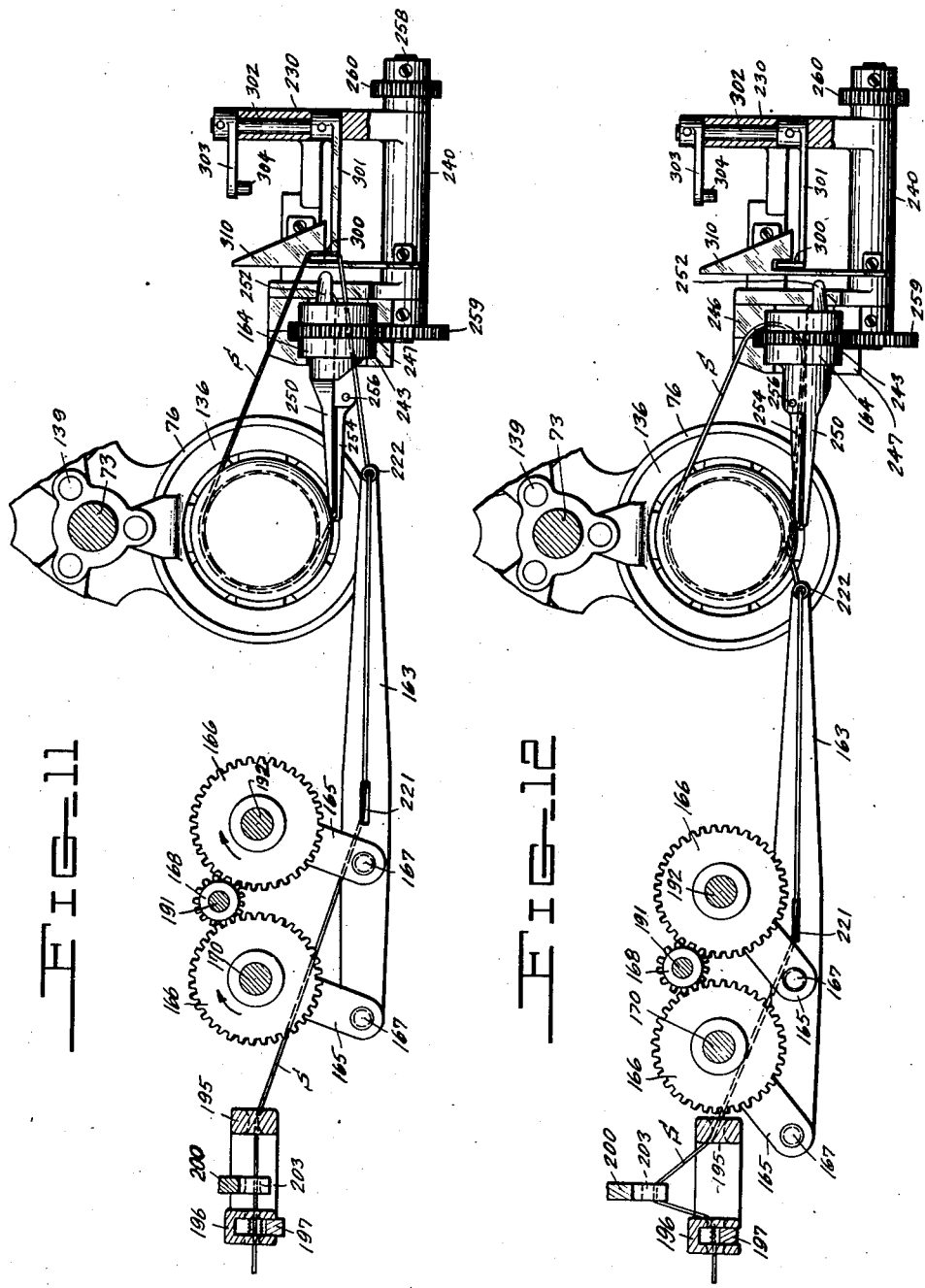

Dec. 12, 1944.  A. J. BRIGGS  2,364,776
MACHINE FOR APPLYING HOOD CAPS TO BOTTLES
Filed April 7, 1941  10 Sheets-Sheet 7

INVENTOR:
Arthur J. Briggs,
BY Bodell & Thompson
ATTORNEYS.

Dec. 12, 1944.    A. J. BRIGGS    2,364,776
MACHINE FOR APPLYING HOOD CAPS TO BOTTLES
Filed April 7, 1941    10 Sheets-Sheet 8

INVENTOR:
Arthur J. Briggs,
BY Bodell & Thompson

Dec. 12, 1944.  A. J. BRIGGS  2,364,776
MACHINE FOR APPLYING HOOD CAPS TO BOTTLES
Filed April 7, 1941    10 Sheets-Sheet 9
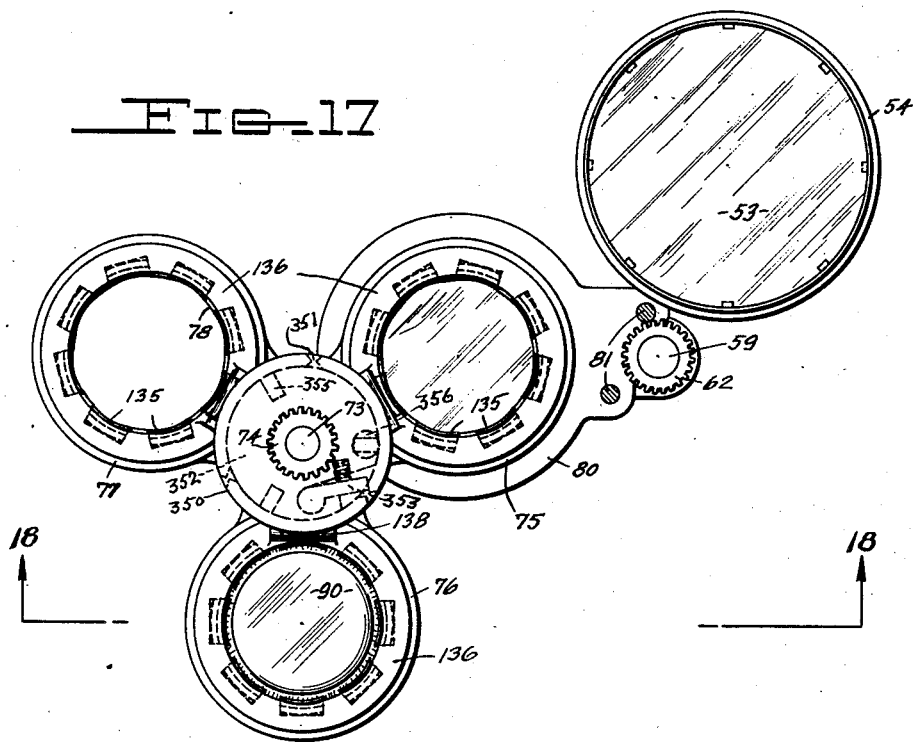
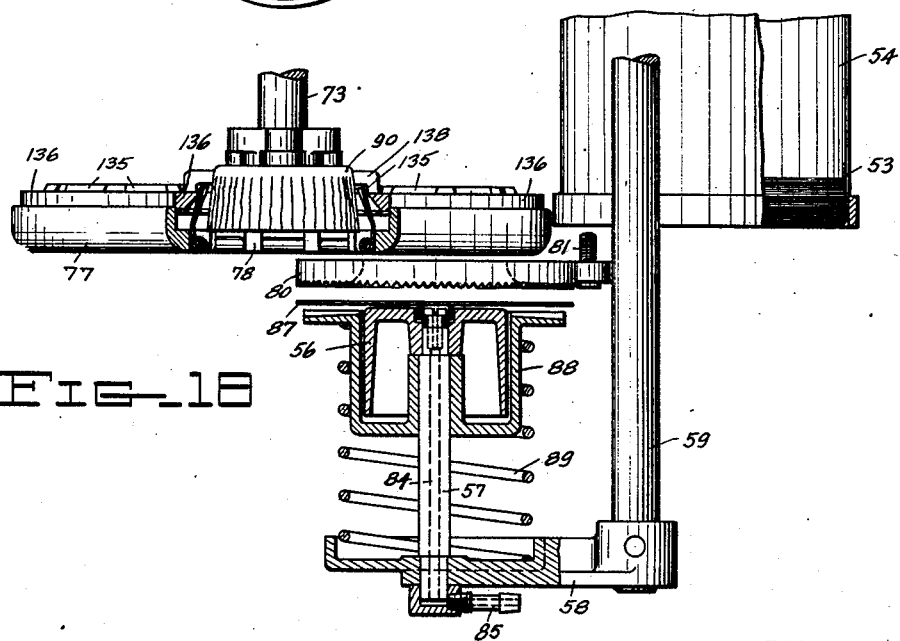
INVENTOR:
Arthur J. Briggs,
BY  Bodell & Thompson Dec. 12, 1944.  A. J. BRIGGS  2,364,776
MACHINE FOR APPLYING HOOD CAPS TO BOTTLES
Filed April 7, 1941  10 Sheets-Sheet 10
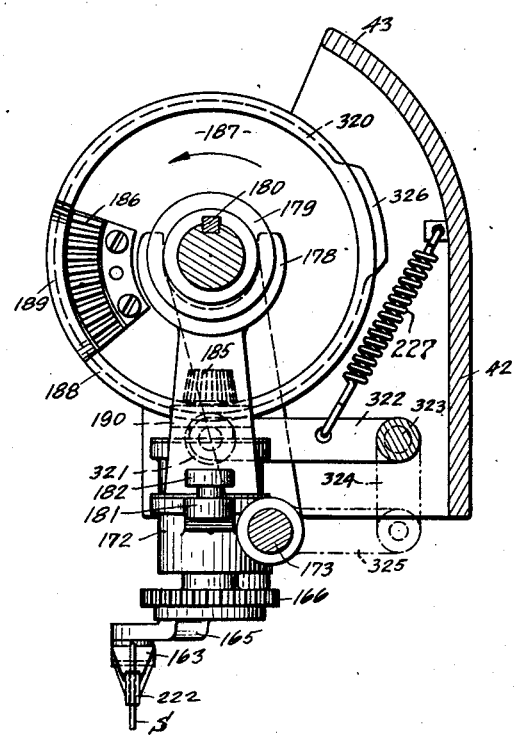
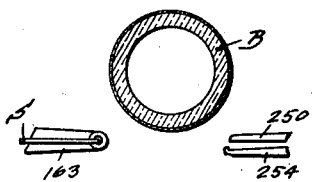
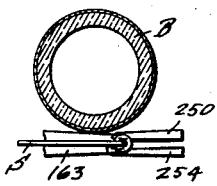
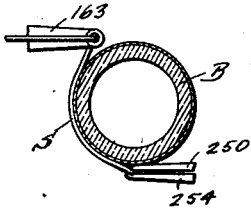
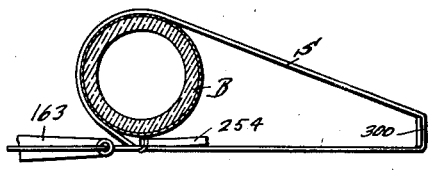
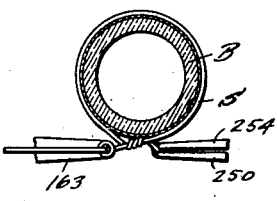
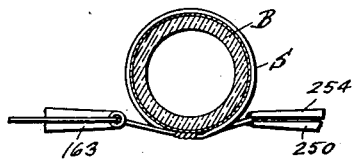
INVENTOR:
Arthur J. Briggs,
BY Bodell & Thompson Patented Dec. 12, 1944

2,364,776

UNITED STATES PATENT OFFICE 2,364,776

MACHINE FOR APPLYING HOOD CAPS TO BOTTLES

Arthur J. Briggs, Syracuse, N. Y., assignor of one-half to William L. Hinds, Fayetteville, N. Y.

Application April 7, 1941, Serial No. 387,190

6 Claims. (Cl. 226—80)

This invention relates to a machine for applying hood caps to bottles. More particularly the invention contemplates a machine operable automatically to form a cup shaped cap from a flat disk of sheet material, such as paper, apply the cap to the bottle and to secure the cap to the bottle by encircling the skirt of the cap with a flexible strand and twisting the overlapping portions of the strand to secure the ends of the strand together in a manner by which the ends of the strands are readily releasable.

The invention has as an object a machine of the type referred to embodying a particularly economical and compact structure operable through a cycle to form and apply the cap and secure the same to the top of the bottle.

The invention has as a further object a cap applying machine embodying a particularly novel mechanism for forming the caps from flat disks of sheet material. Another object of the invention is a novel mechanism for looping the flexible strand about the skirt of the cap and releasably securing the ends of the strand one upon another, said mechanism being particularly simple and durable in use.

The invention consists in the novel features and in the combinations and constructions hereinafter set forth and claimed.

In describing this invention, reference is had to the accompanying drawings in which like characters designate corresponding parts in all the views.

Figure 2 is a front elevational view of the mechanism for looping the strand about the cap and securing the ends of the strand, with parts shown in section and parts broken away, and contiguous parts of the remaining mechanism of the machine being omitted.

Figure 3 is a top plan view of the machine.

Figure 4 is a view taken on line 4—4, Figure 1.

Figure 5 is a view illustrating the drive mechanism of the machine taken on line 5—5, Figure 1.

Figure 6 is an enlarged elevational front view of the structure shown in the right portion of Figure 2.

Figure 7 is a view taken on line 7—7, Figure 6.

Figure 8 is a top plan view of the strand twisting mechanism taken on line 8—8, Figure 6.

Figure 9 is an end elevational view of the drive gearing for the strand twisting unit looking to the left Figure 6.

Figure 10 is a view taken substantially on line 10—10, Figure 6.

Figure 11 is a top plan view of the strand wrapping and twisting mechanisms shown in the lower portion of Figure 2 with parts in section.

Figure 12 is a view, similar to Figure 11, illustrating the relative position of the parts during a later period in the cycle of operation.

Figure 17 is a top plan view of the cap disk transfer and cap forming mechanism.

Figure 18 is a front elevational view, partly in section, of the structure shown on line 18—18, Figure 17.

Figure 19 is an end elevational view, looking to the left Figure 2, of the drive mechanism of the strand wrapping unit.

Figure 1:
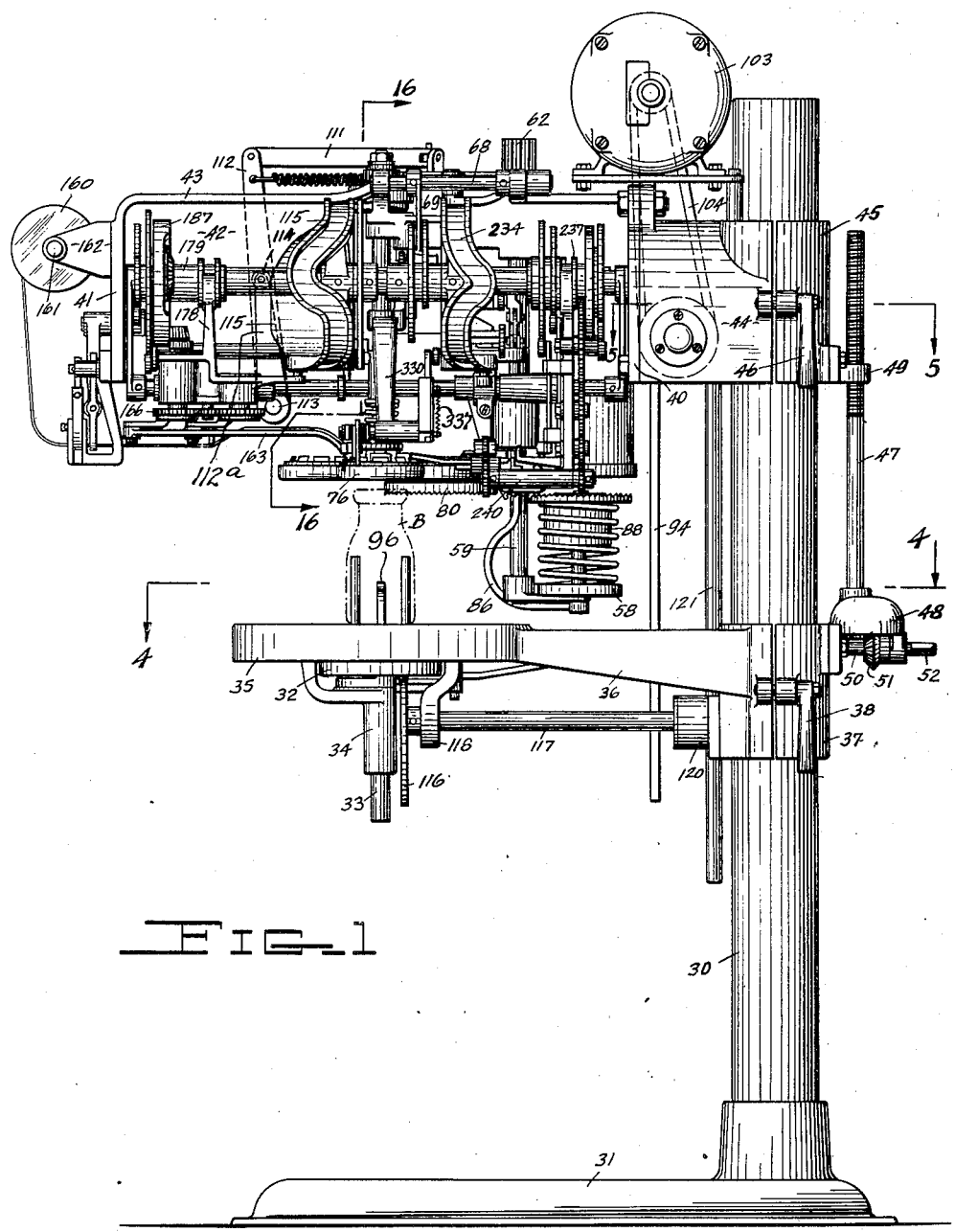
Figure 1 is a front elevational view of a machine embodying my invention.

Figures 20 to 25 inclusive illustrate the top of the bottle and skirt of the cap in section and the contiguous portion of the strand wrapping and twisting units, these views illustrating the successive movement of these units in wrapping the strand about the skirt of the cap, twisting the overlapping portions of the strand and drawing the twisted portions tightly.

The machine is supported on a vertically arranged column 30 mounted upon a suitable base plate 31. During the capping operation, the bottle B is supported upon a cylindrical support 32 mounted on the upper end of a stem 33 slidably mounted in a bracket 34 secured to the under side of a table 35. The table 35 is supported by an arm 36 extending radially from the column 30 and having a split hub 37 provided with the conventional clamping bolt 38, all whereby the table 35 may be adjusted vertically on the column 30 and clamped into adjusted position by the bolt 38.

The mechanism for forming the cap, applying the same to the top of a bottle and securing the strand about the cap, is arranged in a housing having inner and outer end walls 40, 41, a rear wall 42, and a curved top wall 43. The inner wall 40 of this housing is secured to a gear housing 44 having a cylindrical split portion 45 encircling the column 30 and being also provided with a clamping bolt 46. With this arrangement, either the table 35 or the housing 44 may be fixedly secured to the column 30 and the other element adjusted axially of the column to accommodate bottles of different heights.

Where the machine is used with a bottle conveyor, it is preferable to leave the table 35 and arm 36 secured to the column at a height which will bring the table in register with the conveyor and in this instance, the upper housing is adjusted complemental to the height of the bottle being capped. These adjustments are conveniently obtained by a screw 37 journalled at its lower end in a bracket 48 secured to the hub 37 and threading at its upper end into a bracket 49 secured to the hub 45 of housing 44. A short shaft 50 is journalled horizontally in the bracket 48 and is provided with a beveled gear 51 meshing with a similar gear on the lower end of the screw 47. The outer end of the shaft is formed with a flattened portion 52 for the reception of a crank, or similar tool, for the convenient rotation of the shaft.

The caps are formed from flat disks of relatively thin sheet material such as paper. These disks, indicated at 53, are arranged in stack formation in a tubular magazine 54 secured to the rear wall 42 of the top housing as by a bracket 55, see Figure 3. The disks 53 are successively removed from the bottom of the stack formation by a cap transfer member and are presented to a cap forming and cap transferring member, the disk transfer member being cooperable with the cap forming and transfer member to form a disk into the cap of substantially inverted cup formation. The formed cap is transferred in axial alinement with the bottle B on the bottle support, the support being thereupon elevated to bring the top of the bottle into engagement with the cap and thereafter a flexible strand is wrapped about the skirt of the cap with the ends or overlapping portions of the strand twisted together in a manner whereby the cap is securely affixed to the bottle. The twisting of the strand is done in such a manner that the strand is untied or undone by simply grasping one of the protruding ends thereof and pulling the end toward the opposite end of the strand.

The cap transfer member consists of a cylindrical plunger 56 mounted upon the upper end of a stem 57, the lower end of which is secured in an arm 58 carried by a stem 59. The stem 59 is vertically slidable in bosses 60, 61 extending inwardly from the rear wall 42 of the housing. The upper end of the stem 59 is provided with an elongated pinion gear 62. A collar 63 is secured to the stem 59 intermediate the ends thereof to receive a yoke 64 secured to the lower end of a rod 65, the upper end of which is connected to an arm 66 through a link 67. The arm 66 is connected to one end of a shaft 68 journalled horizontally in the top wall 43. The shaft 68 is provided with a downwardly extending arm 69 provided with a roller 70 engaging a cam 71 mounted upon a cam shaft 72 journalled horizontally in the upper housing. During each revolution of the shaft 72, the stem 59 is elevated a short distance, returned to its lowest position, again elevated an appreciable distance, and again returned to its lowest position. The stem 59 is journalled in the frame or housing of the machine in such position that the plunger 56 may be oscillated from a position in alinement with the magazine 54 to a position in alinement with one of the apertures in the cap forming and transfer member.

The cap transfer and forming member is in the nature of a three pocket turret secured to the lower end of a stem 73 journalled vertically in the frame and provided at its upper end with a freely running pinion gear 74. These pockets consist of circular members 75, 76 and 77 extending outwardly from the stem 73 and being equally spaced circumferentially. Each of the members 75, 76, 77 is formed with a central aperture 78 of slightly greater diameter than the plunger 56, see Figures 17, 18. The gear 74 is connected to the upper end of the shaft 73 by means of a one way or ratchet clutch. Accordingly, when the gear is operated in a clockwise direction, Figure 17, the cap transfer mechanism is operated in a similar direction. In Figure 17, the circular member 76 is positioned in alinement with the bottle on the bottle support. The member 75 is positioned to receive a disk 53 transferred from the magazine 54. An annular member 80 is secured to the housing as by screws 81 and is arranged immediately below and in register with a cap forming member when the same is positioned as indicated by said member 75 in Figure 17.

The arrangement is such that the shaft or stem 59 is moved in a clockwise direction Figure 17 to bring the plunger 56 in register with the stack formation in magazine 54. The plunger is thereupon elevated into engagement with the lowermost disk 53 of the stack formation. The stem 57 is provided with an axially extending passage 84, the lower end of which is provided with a laterally extending nipple 85 connected by a flexible tube 86 to a suitable source of vacuum not shown. When the plunger 56 is moved into engagement with the lowermost disk, vacuum is applied through the tube 86 and upon downward movement of the plunger 56, a disk 87 is caused to adhere thereto. Subsequently, the shaft 59 is rotated in a counterclockwise direction Figure 17 until the plunger 56 is moved in register with the annular member 80 and at this time one of the cap forming members 75, 76 or 77 is also positioned in alinement with the member 80. Thereupon, the stem 59 is again elevated causing the peripheral margin of the disk 87 to be compressed between the confronting serrated faces of the member 80 and a cup shaped member 88 slidably mounted upon the stem 57 and urged upward by a helical compression spring 89. Upon further upward movement of the stem 59, the plunger 56 is moved through the aperture in the annular member 80 and through the aperture 78 in the cap forming member 75, 76, or 77. This operation causes the marginal portion of the disk 87 to be gathered and folded downwardly forming a cup shaped cap, as indicated at 90, Figure 18. When the cap is thus formed, the depending skirt portion of the cap springs out radially so that the lower edge thereof rests upon the marginal portion of the cap forming member about the aperture 78. The stem 59 is then moved downwardly to the bottom of its stroke, as indicated in Figure 18, and the cap transfer turret is rotated in a clockwise direction to move the member in which the cap has been formed to the position occupied by the member indicated at 76, Figure 17. The bottle B is thereupon elevated and the top of the bottle passed into the formed cap 90.

The stem 59 is elevated and oscillated and the stem 73 rotated intermittently and in timed relation by cam mechanism mounted upon the shaft 72. The cam shaft 72 is journalled in antifriction bearings 91, 92 arranged in the end walls 40, 41 of the housing. The shaft extends through the end wall 40 into the housing 44 and is provided with a worm gear 93 secured thereto through a one revolution clutch operated by a vertically extending rod 94, the lower end of which is slidably mounted in an arm 95 mounted on the table arm 36. The arm 95 is connected to a pin 96 extending upwardly from the bottle support, this connection being effected through a U shaped member 98 and a link 99. This arrangement is such that when the bottle B is placed upon the bottle support 32 in proper alined relation to the cap applying mechanism, the clutch, indicated at 100, Figure 5, is engaged and remains engaged during one revolution of the cam shaft 72. A worm is mounted upon a shaft 101 journalled at right angles to the shaft 72 and meshes with the worm gear 93. The outer end of the shaft 101 is provided with a pulley wheel 102 connected to a driving motor 103 by means of a belt 104.

The gears 62, 74 are rotated and accordingly the stems 59, 73 by means of an interrupted gear 110 journalled horizontally on the top of the housing. The gear 110 is oscillated through the means of a link 111 pivotally connected at one end to the gear 110 and connected at its other end to a vertically extending lever 112 pivotally mounted to the housing at its lower end as at 113. An arm 112ᵃ is secured to the pivot 113 and provided with a roller 114 engaging the edge of the cylindrical cam 115. The cam 115 is operable to move the lever 112 axially of the shaft 72 and accordingly to effect oscillation of the gear 110. The gear 110 is arranged in mesh with the pinions 62, 74. The pinion 62 is fixedly secured to the stem 59, whereby oscillation of the gear 110 effects oscillation of the stem 59. As previously explained however, the gear 74 is connected to the stem 73 through a one way clutch and accordingly, the stem 73 is only intermittently rotated in one direction, this being a clockwise direction Figure 17.

The bottle support 32 is elevated in proper timed relation by a cam 116 secured on the outer end of a shaft 117 journalled at one end in a bracket 118 depending from the table 35 and at its opposite end in the hub of the arm 36. The inner end of the shaft 117 is provided with a gear 118ᵃ arranged to mesh with a gear 119 journalled in a housing 120 carried by the hub 37 of the table arm and is slidably splined to a vertically extending shaft 121, the upper end of which is provided with a gear 122 arranged in mesh with a gear 123 secured to the end of the cam shaft 72.

These connections are such that the bottle support 32 is elevated at the beginning of the rotation of the cam shaft 72 and is maintained in elevated position during the major portion of the rotation of the shaft 72. This elevation of the bottle support causes the top of the bottle to enter the formed cap 90, as previously stated, and upon further movement the cap is elevated out of the aperture 78 of the cap transfer member, the top of the cap being pressed against the top of the bottle by a pad 130 mounted on a stem slidably mounted in a sleeve 132 slidable vertically in the frame. Upward movement of the pad 130, relative to the sleeve 132, is resisted by a helical compression spring 133 encircling the stem of the pad. During this upward movement of the cap, the skirt thereof is gathered tightly about the neck of the bottle by an annular series of spring fingers 135. The upper ends of the spring fingers 135 are normally positioned radially outwardly, as indicated in Figures 17 and 18. However, during the upward movement of the bottle and the cap, the fingers 135 are pressed radially inwardly by a ring 136 having a tapered bore which is cooperable upon downward movement of the ring to move the free or upper ends of the fingers 135 inwardly, as illustrated in Figure 18. Each of the rings 136 is formed with a radially extending arm 138 fixedly secured to a stem having an enlarged upper head 139, the stems being slidably mounted in the hub portion of the cap transfer member, see Figure 16.

A stem 140 is slidably mounted in brackets 141, 142 and is arranged in axial alinement with the heads 139 when the complemental member 75, 76 or 77 is arranged in axial alinement with the bottle support 32. The annular members 136 are urged upwardly by helical compression springs 145, and the stem 140 is urged upwardly by a helical compression spring 148 arranged between the bracket 141 and a collar 149 secured to the stem 140 and being provided with an arm 150 having a roller 151 engaging a cam 152. The cam 152 is so positioned on the shaft 72 relative to the other cams that the stem 140 is caused to move downwardly and therefore effect downward movement of the ring 136 after the bottle top has entered the cap 90. Thereupon, the skirt of the cap is contracted tightly about the neck of the bottle and maintained in this manner while the flexible strand is wrapped and secured about the skirt of the cap.

The bottle support is elevated sufficiently to move the top of the bottle and the top portion of the cap thereon above the cap transfer members 75, 76, 77, and with the skirt portion of the cap pressed against the neck of the bottle by the contracting fingers 135, as illustrated in Figure 2. During this upward movement of the bottle and the cap, the top of the cap is engaged by the spring pressed plate 130 which has been moved downward by roller 153 carried by sleeve 132 being engaged by a cam 154. As the bottle moves upwardly, spring 133 is compressed and the cap is thus held on the top of the bottle while it is moved upwardly through the aperture of the transfer member. Cam 154 is so formed as to permit the sleeve 132 and pad 130 to be raised above the bottle during the wrapping of the strand around the skirt of the cap.

The flexible strand, in the form of a string, thread, tape, or the like, is carried upon a spool 160 rotatably mounted upon a pin 161 carried in a bracket 162 extending outwardly from the end wall 41. The strand, indicated at S, is wrapped about the skirt of the cap by a strand wrapping unit, the principal element of which is a finger 163, and the wrapped strand is secured by a twisting unit, the main element of which is a rotary member 164.

The wrapping finger 163 is mounted at one end to a pair of arms 165 extending radially from a pair of gears 166. The arms 165 are pivotally secured to the finger 163 as at 167. The gears 166 are connected by a pinion 168 which is arranged to mesh with both gears, and the arrangement is such that the links 165 are maintained in parallel relation. The gear 166, adjacent the end of the finger 163, is secured to the lower end of a shaft 170 journalled vertically in a bracket 172 slidably mounted upon a rod 173 extending lengthwise of the mechanism housing and being supported at each end by an arm 175 journalled for rotation upon the cam shaft 72. Means, hereinafter described, is provided for effecting a slight swinging movement of the rod 173 toward and from the axis of the bottle.

The bracket 172 is provided with an upwardly extending arm 178 and is formed at its upper end with a fork or yoke cooperable with a sleeve 179 slidably mounted upon the shaft 72 and keyed thereto against rotation as by key 180. The arm 178 serves to prevent any rotation of the bracket 172 upon the rod 173 and also to effect axial movement of the sleeve 179 upon the shaft 72 during axial movement of the bracket 172 on the rod 173. The bracket 172 is also provided with an inwardly extending arm 181 having a roller 182 arranged in the groove of the cylindrical cam 115, this cam being operable upon rotation of the shaft 72 to effect axial movement of the bracket 172 and the sleeve 179 toward and from the axis of the bottle.

The shaft 170 is provided at its upper end with a beveled gear 185, rotation of which is effected by a gear segment 186 mounted upon a disk 187 secured to the sleeve 179. The disk 187 is formed with a cylindrical flange 188 having a cut-out portion 189 coextensive with the gear segment 186. The shaft 170 is also provided with a collar 190 arranged just under the beveled pinion 185 and which has a flat surface at its periphery cooperable with the cylindrical flange 188 to prevent rotation of the shaft 170 except when the gear segment 186 is in mesh with the pinion 185.

The connecting pinion 168 is journalled on a stud 191 arranged in the bracket 172, and the inner gear 166 is also similarly arranged on a stud 192.

With this construction it will be apparent that during one revolution of the cam shaft 72, the bracket 172 is successively moved forwardly and rearwardly, and during a portion of this movement the gears 166 are simultaneously rotated. The effect of these movements is to produce an orbital movement of the free end of the finger 163, whereby it travels in a path encircling the cap on the bottle and is effective during such orbital movement to wrap the strand about the skirt of the cap.

Figure 15:
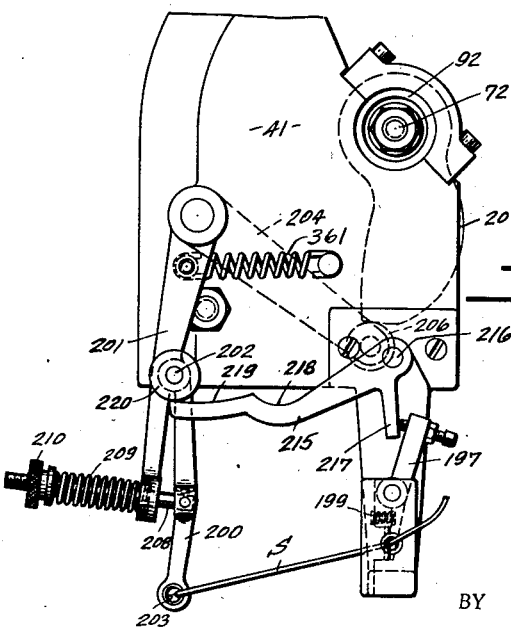
Figure 15 is a view of the strand take-up mechanism shown in Figure 13 with the operating parts of the mechanism in a different position.

The strand S is threaded from the spool 160 downwardly through a take-up mechanism consisting of a hook shaped bracket 195 depending from the end wall 41 of the housing. The outer shorter leg 196 of this bracket is formed with a slot arranged in one side of the leg 196 and extending vertically to receive the lower end of a gripping finger 197 pivotally mounted to the leg as at 198. The outer leg 196 and the inner leg 195 of the bracket are provided with alined apertures to receive the strand S. The lower end of the finger 197 is normally maintained in spaced relation from the leg 196 by a compression spring 199 arranged in the leg 196, see Figure 15, whereby the strand may pass freely through the apertures in legs 195, 196.

The take-up mechanism further includes a take-up arm 200 pivotally mounted at one end to an arm 201 as at 202, and provided at its other end with an eye 203 to receive the strand S. The arm 201 is rigidly connected to an arm 204 extending in angular relation and being provided at its free end with a roller 206 positioned to be engaged by a take-up cam 207. The arm 200 is yieldingly connected intermediate its ends to the free end of the arm 201 by means of a bolt 208 pivotally mounted at one end in the arm 200 and extending through an enlarged aperture in the arm 201. The outer end of the bolt 208 is encircled by a helical compression spring 209 inserted between the end of the arm 201 and an adjusting nut 210.

Figure 13:
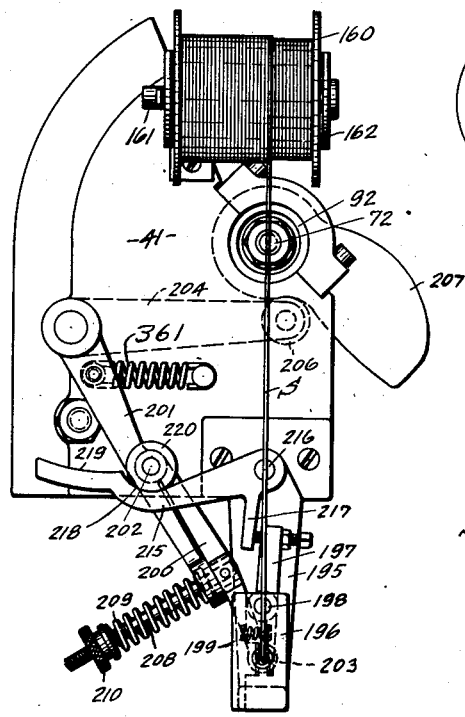
Figure 13 is an end elevational view looking to the right Figure 1.
Figure 14:
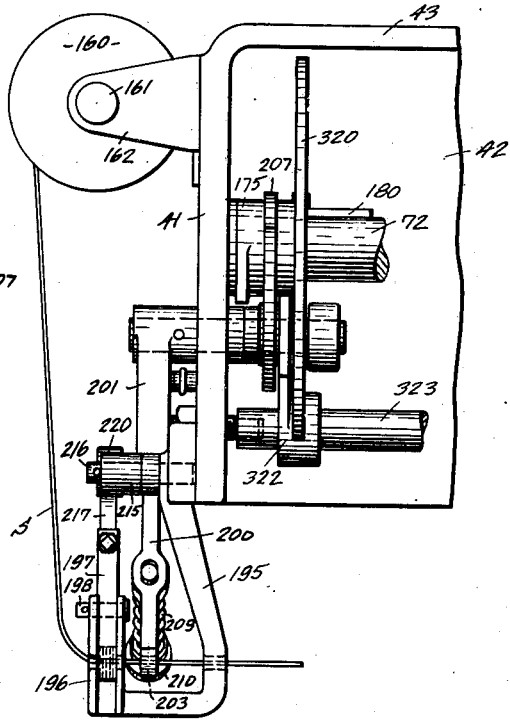
Figure 14 is an enlarged front elevational view of the take-up mechanism shown in Figure 13 and at the extreme left in Figure 1.

Normally, the free end of the arm 200 is positioned so that the eye 203 thereof is in alinement with the apertures in the bracket 195, as illustrated in Figure 13. The take-up mechanism is operable by moving the lower end of the finger 197 into engagement with the bottom wall of the slot in leg 196 of the bracket 195 thus gripping the strand tightly and then moving lever 200 rearwardly to the position shown in Figure 15. The upper end of the finger 197 is moved in a clockwise direction, to gripping position, Figures 13 and 15, by a lever 215 pivotally mounted as at 216 on the bracket 195 and having a depending portion 217 cooperable with the upper end of the finger 197. The lever 215 is provided with cam surfaces 218, 219 which are engaged by a roller 220 carried on the lever 201. The arrangement is such that when the levers 200, 201 are moved toward the bracket 105 by spring 361, the roller 220 is positioned in the lower cam surface 218 of lever 215 permitting the lever to move upwardly, moving the depending portion 217 in a clockwise direction and permitting the lower end of finger 197 to move outwardly under the influence of spring 199 out of strand gripping position. Immediately upon rearward movement of the levers 200, 201, the roller 220 rides up on the cam surface 219 causing the lever 215 to move downwardly and causing the finger 197 to grip the strand. Upon further outward movement of the levers 200, 201, under the influence of cam 207, the slack material in the strand S between the gripping finger 197 and the bottle is taken up, see Figure 15.

The strand S, after leaving the take-up mechanism just described, passes upwardly through an aperture 221 in finger 163, and then downwardly through an eye 222 formed in the free end of the finger. Normally, the strand S depends slightly from the end of the finger 163, as illustrated in Figure 1.

The strand twisting unit is mounted upon a bracket 230 having an elongated sleeve 231 slidably mounted upon the rod 173, the sleeve 231 having a collar 232 adjustably secured to the outer end thereof and provided with a roller 233 positioned in the groove of the cylindrical cam 234 which is somewhat similar in contour to the cam 115 but with complemental portions of the groove or cam track extending in opposite directions to that of cam 115. The bracket 230 extends upwardly and terminates in a yoke 236 engaging a sleeve 237 slidably mounted upon cam shaft 72 and being keyed thereto as by key 238. The depending portion of the bracket 230 is formed with a hub or boss 240 extending toward the bottle in parallel relation to the cam shaft 72 and rod 173. The bracket is also formed with a laterally extending shelf 241, see Figures 7, 8 and 10.

The twisting mechanism per se consists of the cylindrical block 164 formed with an annular flange midway between the ends thereof and machined to form a spur gear 243. The rear end of the block 164 is formed with an annular recess 244, and the forward end is formed with an annular flange 245. The block 164 is rotatably mounted in a pair of supporting blocks 246, 247 provided with mating semi-circular recesses to receive the block 164. The inner block 246 is formed with a flange 249 received by the annular recess 244 on the rear of the block 164, and the block 247 is formed with a recess to receive the flange 245 on the opposite end of the block 164. In this manner, the block 164 is rotatably retained in the blocks 246, 247.

The block 164 is recessed to receive a stationary finger piece 250 formed with a cylindrical portion 251 intermediate its ends and which is arranged within the annular flange 245. The block 164 is also recessed to slidably receive a piece 252 carrying a roller 253. A movable finger piece 254 is pivotally mounted to the finger 250, as at 256, and is provided with a rearwardly extending portion 257 arranged to be engaged by the roller 253 upon axial movement of the piece 252 to the right Figure 8, causing the outer end of the finger 254 to move into strand gripping engagement with finger 250. The piece 252 is pressed outwardly, or to the right Figure 8 by spring 364.

A shaft 258 is rotatably journalled in the hub 240 and is provided at one end with a gear 259 arranged to mesh with the gear 243, and at its opposite end is provided with a gear 260 driven by an interrupted gear 261 mounted upon the cam shaft 72 through a chain of gears 262, 263, 264, 265, journalled upon studs 267 carried by the bracket 230. The gears 262, 263 are attached and rotate together.

In Figure 2, the strand has been wrapped about the skirt of the cap and the overlapping portions of the strand twisted. Immediately following this stage of the operation, a cutting mechanism in the nature of a scissors comprising a blade 270 and a blade 271 movable relative to the blade 270, sever the strand adjacent the free end of the finger 163. The finger 163 and the gripping fingers 250, 254 remain in this position until the mechanism is again initiated on a new cycle by the application of a bottle to the bottle support 32 effecting operation of the one revolution clutch 100 in housing 44. Upon engagement of this clutch, cam shaft 72 begins to rotate in a clockwise direction Figure 16, counter-clockwise direction Figure 19, whereupon the cams 115 and 234 cause axial movement of the finger 163 and the gripping fingers 250, 254 toward the axis of the bottle, which movement is effected to position the depending end of the strand between the gripping fingers 250, 254.

At this time, the free ends of these fingers are spaced apart, this spacing being effected by inward movement of the piece 252 and the roller 253 carried thereby, Figure 8, permitting the tail portion of the finger 254 to move toward the piece 252 and the outer end of the finger to move away from the adjacent end of the stationary finger 250.

The inward movement of the piece 252 is effected by a striker member 275 secured to a shaft 276 journalled transversely in the shelf 241. The opposite end of the shaft 276 is provided with a gear quadrant 277 arranged to mesh with a quadrant 278 having an extending portion 279 engaged by a slide 280 vertically movable in bosses 282, 283 projecting from the bracket 230. The upper end of the slide 280 is provided with a roller 284 engaged by a cam 286. The arrangement of the cam 286 is such that immediately upon operation of the machine, the slide 280 is moved downwardly causing the striker member 275 to swing upwardly engaging the rear end of the piece 252 and moving it inwardly, whereby the gripper fingers 250, 254 are open at the time the strand, depending from the finger 163, is moved in proximity thereto. Immediately after the free end of the strand has been placed between the gripping members 250, 254, cam 286 permits the slide 280 to move upward under the action of tension spring 290 returning the striker member to the position shown in Figure 6.

The striker member 275 is provided with two striking surfaces 291, 292, each moving on a different radius from the axis of the shaft 276. The purpose for the two striking surfaces 291, 292 is that it is necessary to move the piece 252 inwardly at the beginning of the capping operation when this piece is positioned as indicated in Figure 7, and as will be apparent from further description hereinafter, it is also necessary to move the piece 252 inwardly when the block 164 is positioned 180° from that shown in Figure 7, and inasmuch as the piece 252 is located off center of the block its position varies upon rotation of the block thus requiring the two hammers or strikers 291, 292.

In the immediate preceding description, the finger 163 and the gripping fingers 250, 254 have been moved from the position shown in Figure 20 to the position shown in Figure 21, and the depending end of the strand has been gripped by the twisting fingers. The laterally curved surfaces 296, 297 of cams 115, 234 respectively then cause the wrapping unit and the twisting unit to move in opposite directions or away from the axis of the bottle, the movement of the wrapping unit being somewhat greater than the movement of the twisting unit. During this movement, the gear segment 186 has moved into engagement with the pinion 185 effecting rotation of the gears 166. The arrangement of cams 115, 234, the gear quadrant 186, the gears 166 and the links 165 being such as to effect an orbital movement of the free end of the finger 163, or to cause it to encircle the bottle, as illustrated in Figures 22 and 23. After the strand has been wrapped approximately 180° about the skirt of the cap, the wrapping unit is moved to the right, Figure 23, a considerable distance in order to also loop the strand over a hook or upwardly projecting end 300 of an arm 301 pivoted in the bracket 230 on a pin 302. The opposite end of this pin is provided with an arm 303 having a laterally extending pin 304 arranged to be engaged by the offset portion 305 of a slide 306 similar to the slide 280 and which is provided at its upper end with a roller 307 engaged by a cam 308.

The finger or hook portion 300 moves vertically through a slot in a guard plate 310. Normally, the hook 300 is arranged in the up position, as shown in Figure 6, and as the finger 163 is moved through its path the strand is looped about the hook as illustrated in Figure 23. The finger 163 is then moved rearwardly and during all of this movement of the finger 163 up to this point, the block 164 remains stationary and is formed with a slot 311 extending radially inwardly, and due to the fact that the block 164 is positioned, as shown in Figure 7, the strand is drawn through the slot 311, whereby the strand is caused to lie in parallel adjacent relationship to that portion held by the gripping fingers 250, 254.

At this time, the teeth of the intermittent gear 261 mesh with the pinion 262 accordingly effecting rapid rotation of the block 164 and the fingers 250, 254 carried thereby through the gearing carried by the bracket 230. This causes the end of the strand, held by the gripping unit, to be twisted a plurality of times about the intermediate portion of the strand and adjacent the end of the finger 163. In Figure 23, the end of the strand is shown as being twisted one turn about the intermediate portion of the strand. The arrangement of the gearing, carried by the bracket 230, is such as to cause the block 164 to stop or come to rest with the slot 311 extending rearwardly, Figure 12. The block 164 is stopped in this position at the end of the twisting operation in order that the loop of the strand may be drawn about the skirt of the cap by the take-up lever 200. The block is held stationary in both positions by a disk 315 keyed to the cam shaft 72 and provided with cut-out portions 316 which cooperate with a cut-out portion of a disk 317 associated with the pinion 262. With this arrangement, rotation of the pinion 262 is prevented while the gear 261 is rotating to bring the next set of teeth into engagement with the pinion.

With the strand thus looped about the bottle and the hook 300, and the strand having been twisted, cam 308 is then operable to cause the hook 300 to move downwardly, and immediately after this operation the take-up mechanism is effective to pull the strand through the eye of the finger 163, taking up that portion of the strand which was previously looped about the hook 300 and causing the twisted portion to be drawn tightly against the cap, and simultaneously with this operation the rod 173, and accordingly both the wrapping and twisting units, are swung rearwardly to assist in drawing the twisted portion tightly against the cap, as is illustrated in Figure 25. This momentary rearward movement of the rod 173 is effected by a cam 320 coacting with a roller 321 carried on the end of an arm 322, the opposite end of which is secured to a rod 323 journalled in the frame and to which a downwardly depending arm 324 is secured and which is pivotally connected at its outer end to a link 325 Figure 19, and this latter link is connected to the rod 173. Accordingly, when the lobe 326 of the cam 320 engages the roller 321, the rod 175 is swung rearwardly. The shaft 173 is yieldingly maintained in forward position by tension spring 227 connected at one end to the lever 322 and to the opposite end to the housing 42.

Figure 16:
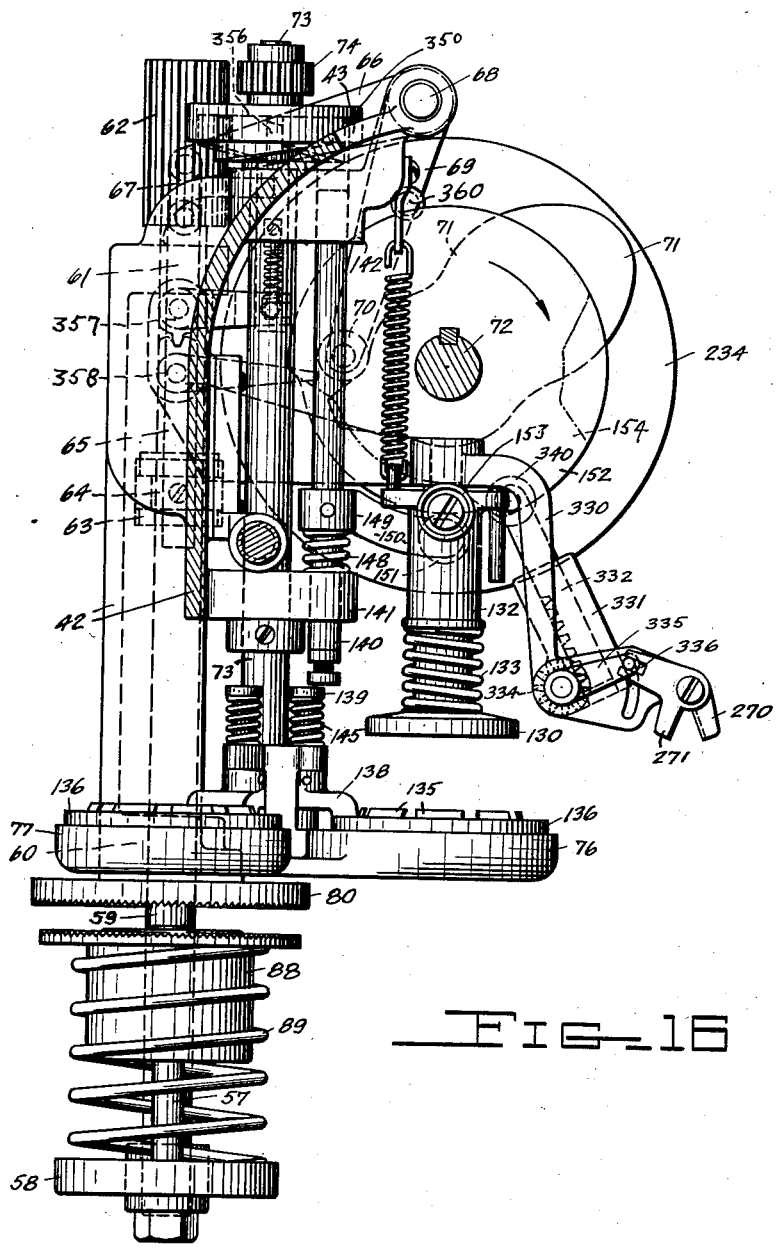
Figure 16 is a view taken on line 16—16, Figure 1.

The capping operation is completed by severing the strand adjacent to the end of the finger 163 by the scissor blades 270, 271. The blade 270 is pivotally mounted on a bracket 330 having an upwardly inclined boss 331, see Figures 1 and 16, and in which a rack 332 is slidably mounted and arranged to mesh with a pinion 334. This pinion is associated with blade 270 and an arm 335 provided with a pin at its outer end operating in a slot 336 formed in the end of the movable blade 271. The blade 270 is maintained in its upward position, as shown in Figure 16, by tension spring 337 connected at one end to the boss 331 and at its opposite end to the blade 270, see Figure 1. The upper end of the rack 332 is provided with a roller 340 which is engaged by a pin 360 carried by cam 234, see Figure 16, and which is operable to depress the rack 332 effecting clockwise rotation of the arm 335, Figure 16. This movement effects clockwise rotation of the blade 270 and the movable blade 271 carried thereby. The arrangement is such that this rotation of the severing mechanism continues until the blades 270, 271 straddle the strand. Further downward movement of the rack thereafter effects counter-clockwise rotation of the movable blade 271 and accordingly the strand is severed. Simultaneously with this operation, the cam 286 again effects operation of the striker member 275 causing inward movement of the piece 252 to effect separation of the gripping fingers 250, 254.

During the operation just described, by which the strand is looped about the skirt of the cap, twisted and drawn up, it will be understood that a disk has been transferred from the magazine 54, drawn through the member 80, and inserted into one of the cap carrying pockets 75, 76, or 77. That is, during the application of a cap to a bottle, a cap is being formed for the next succeeding bottle.

As previously explained, the gear 74 is rotatably mounted upon the upper end of the stem 73 and has associated with it a housing 350 provided with a plurality of notches 351. A disk 352 is secured to the shaft 73 and carries a spring pressed pawl 353, the free end of which engages one of the notches 351 when the gear 74 and housing 350 are rotated in a clockwise direction Figure 17, thus effecting rotation of the shaft 73 in the same direction. The disk 352 is formed with a plurality of slots 355 into which an indexing pin 356 is movable and functions to accurately position the cap transfer member at the end of each movement thereof.

During rotation of the gear 74, the indexing pin 356 is moved downwardly by a link 357 operatively connected with a link 358, the end of which is arranged in the path of movement of pin 359 employed to secure cam 152 to the shaft 72, see Figure 2.

It will be observed that this machine is advantageous in that it is only necessary to supply the dairy with the flat disks 53, and that the machine is entirely automatic in its operation of successively transferring the flat disks from the magazine, forming them into hood cap form, applying the formed cap to the bottle, and securing the same to the top of the bottle by wrapping the twine about the skirt of the cap and twisting the overlapping portions of the twine together. This operation of securing the ends of the twine consumes materially less time than the tying of a knot, and while the strand is conveniently removed by simply pulling either end thereof toward the other it, nevertheless, securely holds the cap on the bottle during ordinary handling and use.

This method of securing the hood cap to the bottle produces a tamper-proof product in that the twisted ends of the strand are of such length that they can not be conveniently tied or otherwise secured once the strand has been undone.

What I claim is:

1. A machine for securing hood caps to bottles comprising means for supporting a supply of flexible strand, a strand gripping member formed with a slot extending radially inwardly to the axis thereof and operable to grip the free end of the strand, a wrapping finger, motion transmitting means operable to effect an orbital movement of said finger to loop the strand about the skirt of the cap and through said slot and the axis of said gripping member with a portion of the strand overlapping the free end held by said member, motion transmitting means operable to thereupon effect rotation of said gripping member to twist the overlapping portions of the strand, and means operable to subsequently draw that portion of the loop extending through said gripping member against the skirt of the cap thereby forming a band for securing the cap on the top of the bottle, and severing means operable to sever the band from the supply of strand.

2. A machine for securing hood caps to bottles comprising means for supporting a supply of flexible strand, a wrapping finger, said strand extending through an eye formed in the end of said finger, a gripping member formed with a slot extending radially from the axis thereof, said gripping member being operable to grip the free end of the strand, and motion transmitting means operable to effect an orbital movement of the end of said finger to loop the strand about the skirt of the cap and through the slot in said gripping member with a portion of the strand overlapping the end thereof held by said gripping member, motion transmitting means operable to effect rotation of said gripping member to twist the overlapping portions of the loop, and means operable to draw that portion of the strand extending through said gripping member against the skirt of the cap thereby forming a cap securing band encircling the skirt portion of the cap, and severing mechanism operable to sever the band from said supply of strand.

3. A machine for securing hood caps to bottles comprising means for supporting a supply of flexible strand, a strand wrapping finger being provided at one end with an eye through which said strand is threaded, a strand gripping member formed with gripping fingers extending forwardly toward the bottle and being operable to grip the free end of the strand and being formed with a slot extending radially from the axis thereof, a hook arranged rearwardly of said gripping member, motion transmitting means operable to effect an orbital movement of the end of the wrapping finger to loop the strand about the skirt of the cap and over said hook and through the slot in said gripping member with a portion of the strand overlying the free end thereof.

4. A machine for securing hood caps to bottles comprising means for supporting a supply of flexible strand, a strand wrapping finger being provided at one end with an eye through which said strand is threaded, a strand gripping member formed with gripping fingers extending forwardly toward the bottle and being operable to grip the free end of the strand and being formed with a slot extending radially from the axis thereof, a hook arranged rearwardly of said gripping member, motion transmitting means operable to effect an orbital movement of the end of the wrapping finger to loop the strand about the skirt of the cap and over said hook and through the slot in said gripping member with a portion of the strand overlying the free end thereof, motion transmitting means to effect rotation of said gripping member to twist the overlapping portion to the strand, means for moving said hook out of engagement with the loop and take-up mechanism operable thereupon to draw the strand through the slot of said gripping member and contract the same about the skirt of the cap, and severing mechanism operable to sever the loop from the source of supply.

5. A machine for securing hood caps to bottles comprising a finger piece movably mounted on the frame and being formed at one end with an eye, means for supporting a supply of strand threaded through said eye and depending therefrom, a strand gripping member positioned in proximity to the top of the bottle on said support, actuating means cooperable to effect relative movement between said finger and said gripping member to position the depending portion of said strand in the gripping elements of said gripping member, means operable to close said gripping elements upon the strand, said actuating means being operable to further move said finger in an orbital path to encircle the skirt of the cap with said strand, means operable to effect rotation of said gripping member to wrap the adjacent portion of the strand held thereby around the intermediate portion of the strand extending from the eye of said finger, said actuating means being also operable to effect relative axial movement between said finger and gripping member to draw the twisted portion of the strand tight, cutting means operable to sever the intermediate portion of the strand adjacent the eye of said finger, and means operable to release said gripping elements.

6. A machine for securing hood caps to bottles comprising means for supporting a supply of flexible strand, wrapping mechanism operable through an orbital path to wrap the strand about the skirt of the cap with one portion of the strand overlapping another, twisting mechanism operable to twist said overlapping portions tangentially to the cap, and means operable to contract the strand about the cap skirt, thereby forming a cap securing band, and severing mechanism operable to sever the strand from the supply thereof.

ARTHUR J. BRIGGS.